United States Patent
Ogura (10) Patent No.: US 9,843,789 B2
(45) Date of Patent: Dec. 12, 2017

(54) STILL-IMAGE EXTRACTING METHOD AND IMAGE PROCESSING DEVICE FOR IMPLEMENTING THE SAME

(71) Applicant: Panasonic Intellectual Property Management Co., Ltd., Osaka (JP)

(72) Inventor: Yasunobu Ogura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 230 days.

(21) Appl. No.: 14/803,960

(22) Filed: Jul. 20, 2015

(65) Prior Publication Data

US 2016/0073095 A1    Mar. 10, 2016

(30) Foreign Application Priority Data

Sep. 8, 2014  (JP) ................. 2014-182721
Apr. 15, 2015  (JP) ................. 2015-082965

(51) Int. Cl.
*H04N 13/02* (2006.01)
*G06T 7/20* (2017.01)
*G06T 7/00* (2017.01)
*G06T 7/593* (2017.01)

(52) U.S. Cl.
CPC ......... *H04N 13/0282* (2013.01); *G06T 7/596* (2017.01); *H04N 13/0221* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2004/0100566 | A1* | 5/2004 | Valleriano | G07C 1/22 348/231.99 |
| 2007/0053679 | A1 | 3/2007 | Beniyama et al. | |
| 2007/0296821 | A1* | 12/2007 | Kakkori | G03B 7/00 348/208.6 |
| 2010/0026823 | A1* | 2/2010 | Sawada | G03B 7/28 348/222.1 |

(Continued)

FOREIGN PATENT DOCUMENTS

| | | |
|---|---|---|
| JP | 2002-77941 A | 3/2002 |
| JP | 2007-72537 A | 3/2007 |
| JP | 2009-212728 A | 9/2009 |

*Primary Examiner* — Frederick Bailey
(74) *Attorney, Agent, or Firm* — McDermott Will & Emery LLP (57) ABSTRACT

A still-image extracting method is disclosed. Frames of an object are extracted as still images from a moving image stream chronologically continuously captured by a camera. The camera moves relative to the object. First frames are extracted from the moving image stream. Image capture times of the extracted first frames are obtained. Image capture positions of the camera at the image capture times of the first frames are identified based on the first frames. Image capture times of the frames captured at image capture positions spaced at equal intervals are estimated based on both the image capture positions, identified by the first frames, of the camera and the obtained image capture times. Second frames at the estimated image capture times are extracted as frames captured and obtained at image capture positions spaced apart at equal intervals from the moving image stream.

12 Claims, 8 Drawing Sheets

(56) References Cited

U.S. PATENT DOCUMENTS

| | | | |
|---|---|---|---|
| 2010/0321510 A1* | 12/2010 | Tsutsumi | G06T 5/003 348/208.4 |
| 2013/0215239 A1* | 8/2013 | Wang | G06T 7/579 348/50 |
| 2014/0049657 A1* | 2/2014 | Fukunishi | H04N 5/23254 348/208.4 |
| 2015/0036888 A1* | 2/2015 | Weisenburger | G06T 7/80 382/107 |

* cited by examiner

| Initial sample point | $S_0(S_b)$ | $S_1$ | $S_2$ | $S_3$ | $S_4$ | $S_5$ | $S_6$ | $S_7$ |
|---|---|---|---|---|---|---|---|---|
| Time stamp $S_i$ | 60 | 120 | 180 | 240 | 300 | 360 | 420 | 480 |
| Angle from resampling point, $\theta_i(°)$ | 0 | 30 | 75 | 120 | 160 | 200 | 270 | 320 |

FIG. 9

$\theta = 22.5°$

Reference point $S_b$ ($T_0$)

FIG. 10

Reference point $S_b$

STILL-IMAGE EXTRACTING METHOD AND IMAGE PROCESSING DEVICE FOR IMPLEMENTING THE SAME

RELATED APPLICATIONS

This application claims the benefit of Japanese Application No. 2014-182721, filed on Sep. 8, 2014 and Japanese Application No. 2015-082965, filed on Apr. 15, 2015, the disclosure of which Applications are incorporated by reference herein.

BACKGROUND

1. Technical Field

The present technique relates to a still-image extracting method for extracting a plurality of frames as still images from a moving image stream and an image processing device for implementing the method.

2. Description of the Related Art

To obtain peripheral data of a substance, images of the substance are captured as an object by a camera at each of peripheral positions of the substance. The positions of the camera that captures images of the substance (hereinafter, these positions are referred to as image capture positions) are desirably spaced apart at equal intervals so that peripheral still images of the substance are interactively displayed and browsed.

Conventionally, to obtain still images at the image capture positions, still images are continuously captured at the individual image capture positions (refer to Unexamined Japanese Patent Publication No. 2007-72537). In other words, the camera is fixed at each of image capture positions. A process that causes the camera to capture a still image of an object is repeated at each of image capture positions that are changed as the camera is moved.

SUMMARY

A still-image extracting method according to the present technique is a still-image extracting method for extracting a plurality of frames of an object as still images from a moving image stream chronologically continuously captured by a camera, the camera moving relative to the object, the method includes: extracting a plurality of first frames from the moving image stream and obtaining image capture times of each of the first frames extracted; identifying image capture positions of the camera at the image capture times of each of the first frames based on the plurality of first frames; estimating image capture times of the plurality of frames captured at a plurality of image capture positions spaced at equal intervals based on both the image capture positions, identified by the plurality of first frames, of the camera and the obtained image capture times; and extracting, from the moving image stream, second frames at the estimated image capture times as a plurality of frames captured at a plurality of image capture positions spaced apart at equal intervals.

DETAILED DESCRIPTION

Hereinafter, an image processing device according to an exemplary embodiment of the present technique will be described with reference to the accompanying drawings. However, unnecessarily detail description may be omitted. For example, description of well-known matters and redundant description of substantially identical structures may be omitted so that a person skilled in the art can easily understand the present technique.

The inventor presents the accompanying drawings and the following description so that a person skilled in the art can satisfactorily understand the present technique. Thus, the accompanying drawings and the following description do not limit the subject described in the scope of claim.

[1-1. Structure]

Figure 1:
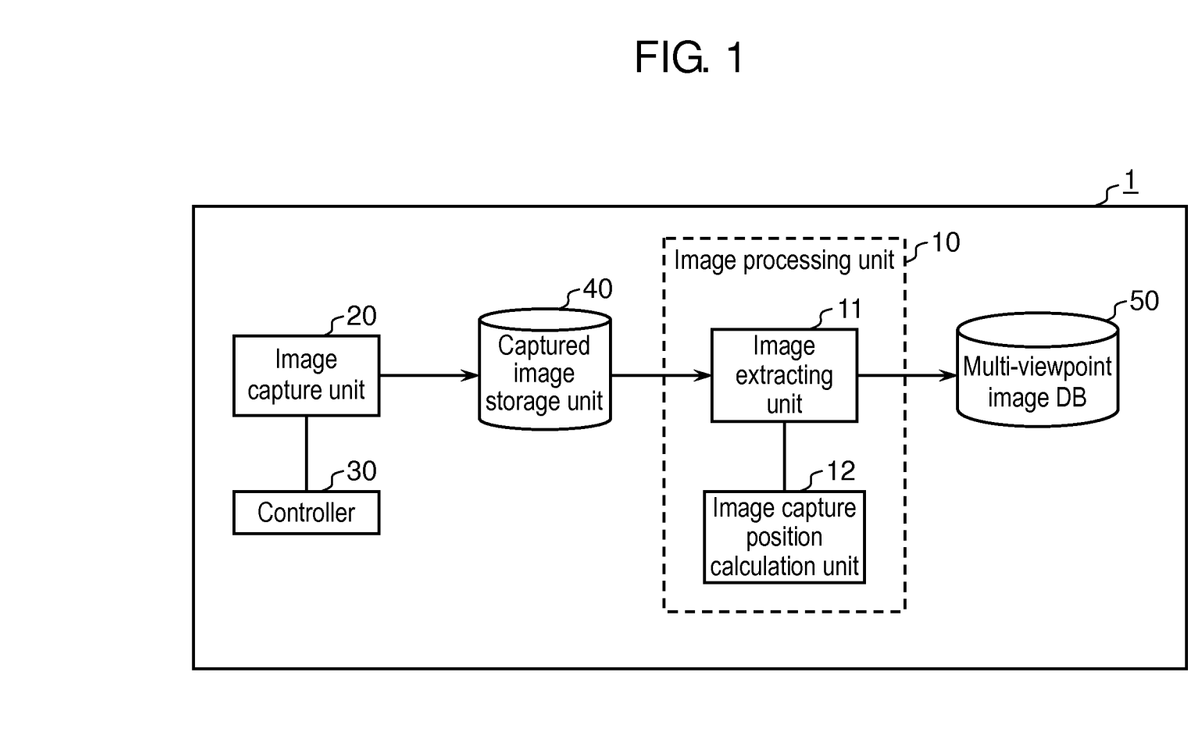
FIG. 1 is a schematic diagram illustrating a structure of an image processing system according to an exemplary embodiment of the present technique.

FIG. 1 is a schematic diagram illustrating a structure of an image processing system according to an exemplary embodiment of the present technique.

Image processing system 1 according to the present exemplary embodiment is a system that causes a camera to continuously capture images of an object while causing the camera to move relative to the object, to obtain a moving image stream, and to extract a plurality of frames as still images from the moving image stream. Image processing system 1 includes image processing unit 10, image capture unit 20, controller 30, captured image storage unit 40, and multi-viewpoint image database (DB) 50.

In image processing system 1 according to the present exemplary embodiment, a moving image stream is captured and generated at a frame rate of for example 60 fps (frame per second). The moving image stream contains a plurality of frames captured at equal time intervals, namely 1/60 seconds. In addition, whenever a frame is captured and generated, a time stamp that is incremented by 1 is added to the frame. Thus, time stamps represent frames capture times.

For example, if a moving image stream has a frame rate of 60 fps and a frame starts with a time stamp of "1," a frame captured and generated after an elapse of one second has a time stamp of "1" plus "60." Thus, if a frame starts with a time stamp of "10", a frame captured and generated and after an elapse of one second has a time stamp of "70."

According to the present exemplary embodiment, a moving image stream is a moving image composed of frames captured and generated at equal time intervals. Alternatively, a moving image stream may be a group of still images continuously captured and generated at equal time intervals. The still images continuously captured and generated at equal time intervals are correlated with, for example, image IDs. The image IDs can be treated in a same manner as time stamps. Thus, according to the present exemplary embodiment, time stamps are used for the still-image extracting method. When a moving image stream is a group of still images continuously captured and generated at equal time intervals, image IDs are used for the still-image extracting method.

Image processing unit 10 extracts a plurality of frames as still images from a moving image stream stored in captured image storage unit 40. The still images of the plurality of frames become images captured at a plurality of image capture positions spaced apart at equal intervals. The moving image stream can be obtained in such a manner that while the camera is caused to move relative to the object, images of the object are temporally continuously captured. For example, image processing unit 10 performs imaging by using the camera which moves on the circumference centering the object to obtain a moving image stream, and extracts still images captured at 36 image capture positions aligned at equal angular intervals of 10 degrees from the moving image stream.

Image processing unit 10 includes image extracting unit 11 and image capture position calculation unit 12.

Image extracting unit 11 extracts a plurality of first frames contained in the moving image stream and obtains image capture times of the plurality of first frames. In addition, image extracting unit 11 performs an initial sampling operation and a resampling operation.

Image capture position calculation unit 12 identifies information about image capture positions where the plurality of first frames is captured by the camera at image capture times of the plurality of first frames on the first frames. Image capture position calculation unit 12 estimates image capture times of a plurality of frames captured and obtained by the camera at a plurality of image capture positions spaced apart at equal intervals based on the image capture times of the first frames and the information about the identified image capture positions of the first frames.

When image extracting unit 11 performs the initial sampling operation, image extracting unit 11 extracts the plurality of first frames contained in the moving image stream and obtains time stamps that represent the image capture times of the extracted plurality of first frames. Hereinafter, first frames extracted by image extracting unit 11 that performs the initial sampling operation are referred to as initial sampling frames. At this point, image extracting unit 11 extracts a plurality of initial sampling frames so that the time stamps are aligned at equal time intervals.

When the image extracting unit 11 performs the resampling operation, image extracting unit 11 extracts second frames corresponding to the image capture times (time stamps) estimated by image capture position calculation unit 12 from the moving image stream. The second frames are extracted from the moving image stream as a plurality of frames captured and obtained at a plurality of image capture positions spaced apart at equal intervals. Hereinafter, the second frames extracted by image extracting unit 11 that performs the resampling operation are referred to as resampling frames. For example, image extracting unit 11 extracts 36 resampling frames as frames captured and obtained by the camera at image capture positions aligned at equal angular intervals of 10 degrees.

Image capture position calculation unit 12 identifies image capture positions of the camera based on the time stamps of the initial sampling frame. In other words, image capture position calculation unit 12 can identify a position of the camera relative to an object when the camera captures images of the object. Hereinafter, image capture positions identified by initial sampling frames are referred to as initial sampling points.

In addition, image capture position calculation unit 12 estimates time stamps of a plurality of frames captured and obtained at a plurality of image capture positions based on the initial sampling points and the time stamps obtained based on the initial sampling operation. Hereinafter, image capture positions identified by resampling frames are referred to as resampling points.

Figure 2:
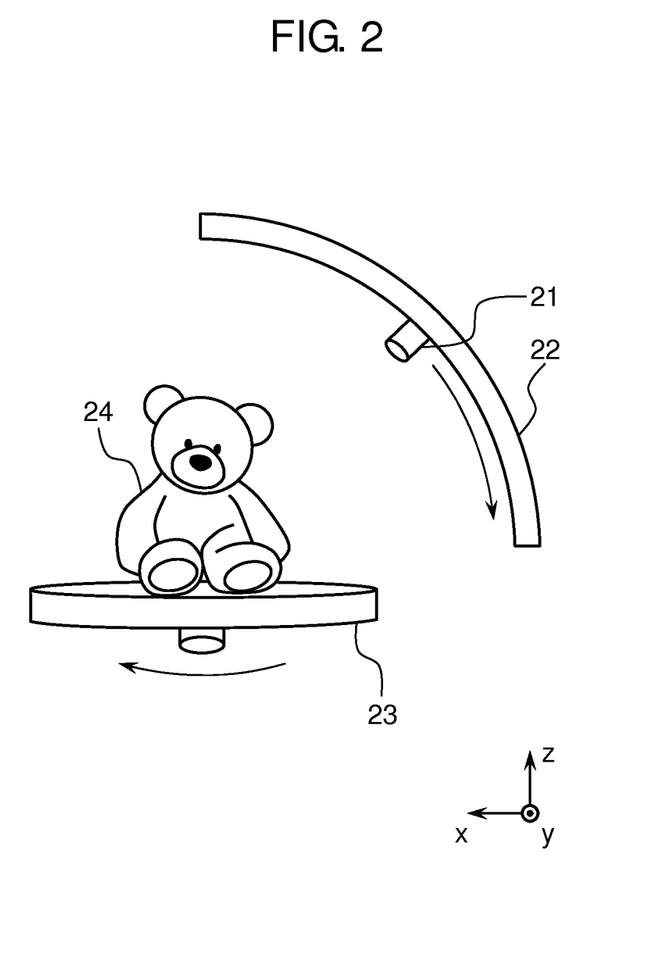
FIG. 2 is a schematic diagram describing an object image capture method performed by an image capture unit according to the exemplary embodiment.

FIG. 2 is a schematic diagram describing an object image capture method by an image capture unit according to the present exemplary embodiment.

As illustrated in FIG. 2, image capture unit 20 includes camera 21, robot arm 22, and turntable 23. Turntable 23 is a table on which object 24 is placed and which rotates about a rotation axis of turntable 23 (a Z axis illustrated in FIG. 2). A rotation speed of turntable 23 is not always constant because of a centroid position of object 24 placed on turntable 23, an inaccuracy that occurs in a mechanical structure of turntable 23, and so forth. Camera 21 captures images of object 24 placed on turntable 23 to generate a moving image stream of object 24 that rotates. In other words, camera 21 captures images of object 24 to generate a moving image stream, while moving relative to object 24 on a circumference centering object 24. Camera 21 is mounted on robot arm 22. Robot arm 22 allows camera 21 to move in a circumference direction on an XY plane illustrated in FIG. 2 in which object 24 is centered.

Object 24 is a substance that is placed at a rotational center of turntable 23. Images of object 24 are captured by camera 21. Images of object 24 are captured by camera 21 at a plurality of image capture positions spaced apart at equal intervals (namely, at equal angular intervals). The images of object 24 captured by camera 21 are represented as for example three-dimensional computer graphics (CG) by image processing unit 10.

According to the present exemplary embodiment, as turntable 23 rotates, camera 21 captures images of object 24 while camera 21 moves relative to object 24. Alternatively, camera 21 may capture images of object 24, while actually moving on the circumference centering object 24.

According to the present exemplary embodiment, camera 21 captures images of object 24 while moving relative to object 24 on the circumference centering object 24. Alternatively, camera 21 may capture images of object 24 while camera 21 linearly moves. As a result, resampling frames may be extracted as a plurality of frames captured and obtained by camera 21 at a plurality of image capture positions spaced apart at equal intervals.

Controller 30 controls image capture unit 20 to capture images. Specifically, controller 30 controls camera 21 to start and stop capturing a moving image, turntable 23 to rotate, and robot arm 22 to move camera 21. Thus, controller 30 rotates turntable 23 so that camera 21 captures images of object 24 at positions on a same plane as a table plane of turntable 23, namely, on the circumference centering object 24. In addition, controller 30 controls robot arm 22 to move camera 21 in the circumferential direction on an XZ plane illustrated in FIG. 2 in which object 24 is centered. In other words, controller 30 repeatedly controls the rotation of turntable 23 and the movement of camera 21 by robot arm 22. As a result, controller 30 causes camera 21 to capture images of object 24 at spherical positions around object 24.

Captured image storage unit 40 is for example a nonvolatile memory that stores the moving image stream generated by image capture unit 20. Captured image storage unit 40 stores time stamps that represent image capture times of frames contained in a moving image stream.

Multi-viewpoint image DB 50 is composed of for example a nonvolatile memory. Multi-viewpoint image DB 50 stores a plurality of resampling frames as still images. The resampling frames are extracted by image processing unit 10 and captured and obtained by camera 21 at a plurality of image capture positions estimated to be spaced apart at equal intervals.

[1-2. Operation]

Next, an operation of image processing system 1 according to the present exemplary embodiment will be described.

Figure 3:
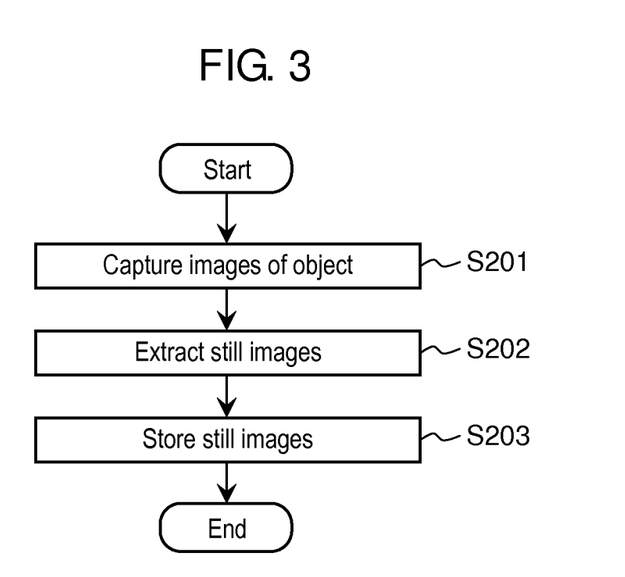
FIG. 3 is a flow chart illustrating an operation of image processing system 1 according to the exemplary embodiment.

FIG. 3 is a flow chart illustrating an operation of image processing system 1 according to the present exemplary embodiment.

As illustrated in FIG. 3, image capture unit 20 captures images of object 24 under a control of controller 30 (in step S201). Specifically, controller 30 controls the rotation of turntable 23 so that camera 21 captures images of object 24 placed on turntable 23 at 360-degree peripheral positions of object 24. In addition, controller 30 controls the movement of camera 21 by robot arm 22 so that camera 21 moves in the circumferential direction centering object 24 on a plane perpendicular to a table plane of turntable 23. Thus, camera 21 captures images of object 24 at 360-degree peripheral positions of object 24 at the moved position. Controller 30 repeatedly controls the rotation of turntable 23 and the movement of camera 21 by robot arm 22, so that camera 21 captures images of object 24 at spherical positions centering object 24 to generate a moving image stream. The generated moving image stream is stored in captured image storage unit 40. At this time, time stamps that represent image capture times of frames contained in the moving image stream are also stored. In other words, a plurality of frames contained in the moving image stream and the time stamps corresponding to the plurality of frames are stored in captured image storage unit 40.

Thereafter, image processing unit 10 extracts a plurality of frames captured and obtained by camera 21 at a plurality of image capture positions estimated to be spaced apart at equal intervals (resampling points) from the moving image stream stored in captured image storage unit 40 (in step S202).

Last, image processing unit 10 stores the extracted resampling frames as still images to multi-viewpoint image DB 50 (in step S203).

Figure 4:
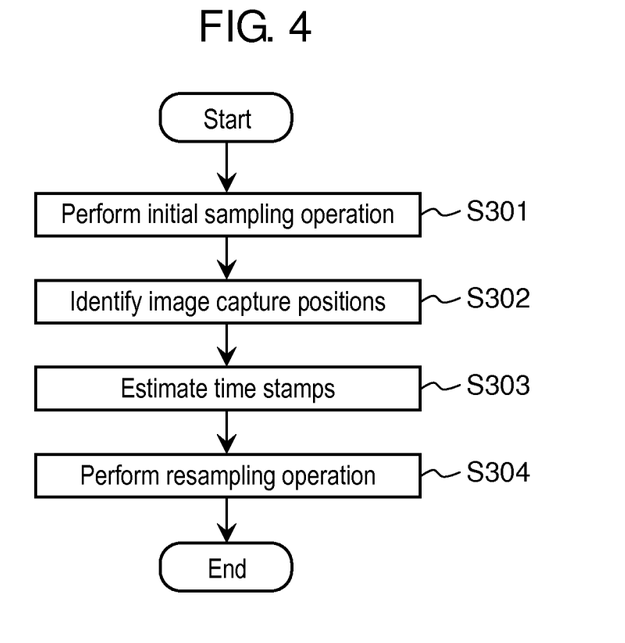
FIG. 4 is a flow chart illustrating an operation performed corresponding to a still-image extracting method according to the exemplary embodiment.

FIG. 4 is a flow chart illustrating an operation performed corresponding to the still-image extracting method according to the present exemplary embodiment. FIG. 4 illustrates a detail process of step S202 illustrated in FIG. 3.

First, image extracting unit 11 performs the initial sampling operation that extracts a plurality of initial sampling frames from a moving image stream stored in captured image storage unit 40 and obtains time stamp corresponding to the extracted initial sampling frames (in step S301). For example, image extracting unit 11 extracts eight initial sampling frames from the moving image stream and obtains eight time stamps corresponding to the extracted eight initial sampling frames. In this example, it is assumed that the extracted eight initial sampling frames are eight frames having time stamps aligned at equal time intervals. In other words, image extracting unit 11 extracts initial sampling frames at equal time intervals. The number of initial sampling frames is not limited to eight, and may be 2 to 7 or greater than 9. As the number of initial sampling frame increases, estimation accuracy of the time stamps of the plurality of frames captured by camera 21 at resampling points (that will be described later) improves.

Thereafter, image capture position calculation unit 12 identifies image capture positions (initial sampling points) of camera 21 based on the time stamps of the eight initial sampling frames extracted by image extracting unit 11 (in step S302).

In addition, image capture position calculation unit 12 estimates time stamps of frames captured and obtained by camera 21 at resampling points based on the identified eight initial sampling points and the time stamps of the eight initial sampling frames obtained by image extracting unit 11 (in step S303).

Last, image extracting unit 11 performs the resampling operation that extracts resampling frames as a plurality of frames captured and obtained by camera 21 at resampling points, from a moving image stream stored in captured image storage unit 40 (in step S304).

Figure 5:
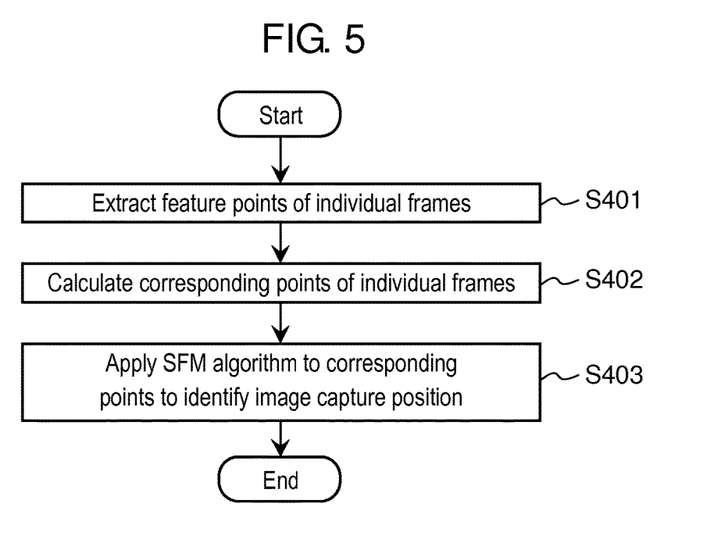
FIG. 5 is a flow chart illustrating an identifying method for image capture positions of camera 21 according to the exemplary embodiment.

FIG. 5 is a flow chart illustrating an identifying method for image capture positions of camera 21 according to the present exemplary embodiment. FIG. 5 illustrates a detail process of step S302 illustrated in FIG. 4.

First, image capture position calculation unit 12 extracts feature points (feature amounts) of eight initial sampling frames (in step S401). Feature points are extracted by a corner detection method such as Scale-Invariant Feature Transform (SIFT) or Harris. Note that feature points may be extracted by any method other than these methods.

Thereafter, image capture position calculation unit 12 calculates corresponding points of frames by matching the features points of the extracted eight initial sampling frames (in step S402).

Last, image capture position calculation unit 12 identifies image capture positions by applying the SFM (Structure From Motion) algorithm for the calculated corresponding points of frames (in step S403).

In such a manner, initial sampling points that are image capture positions of camera 21 are identified based on the time stamps of eight initial sampling frames. Each of initial sampling points is represented by for example coordinates $(X_i, Y_i, Z_i)$ having any origin. According to the present exemplary embodiment, eight initial sampling frames are extracted in the initial sampling, namely, i=0 to 7.

Figure 6:
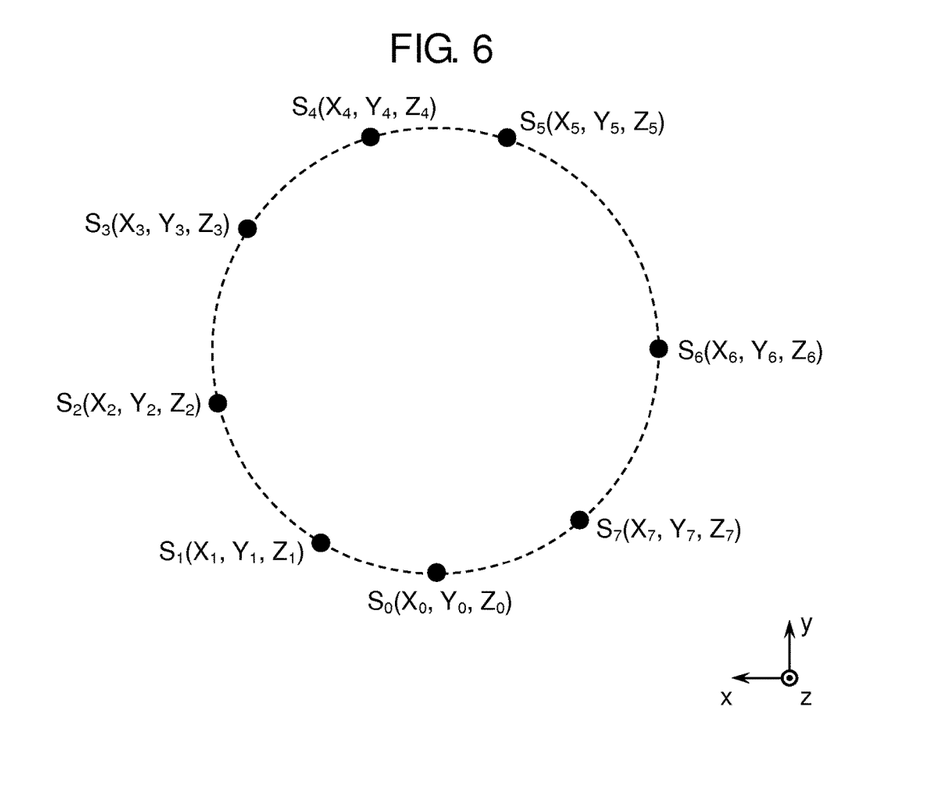
FIG. 6 is a schematic diagram describing initial sampling points according to the exemplary embodiment.

FIG. 6 is a schematic diagram describing initial sampling points according to the present exemplary embodiment. In FIG. 6, $S_0(X_0, Y_0, Z_0)$ to $S_7(X_7, Y_7, Z_7)$ represent individual initial sampling points and their coordinates. According to the present exemplary embodiment, image extracting unit 11 extracts eight initial sampling frames at predetermined time intervals. As illustrated in FIG. 6, individual initial sampling points are not spaced apart at equal intervals. In other words, although image extracting unit 11 extracts eight initial sampling frames so that time stamps are aligned at equal time intervals in the initial sampling operation, the extracted eight initial sampling frames are not spaced apart at equal intervals. This is because turntable 23 does not rotate at a constant speed. Thus, even if image extracting unit 11 extracts the plurality of initial sampling frames so that time stamps obtained in the initial sampling are aligned at equal time intervals, initial sampling points are image capture positions that are not perfectly aligned.

Figure 7:
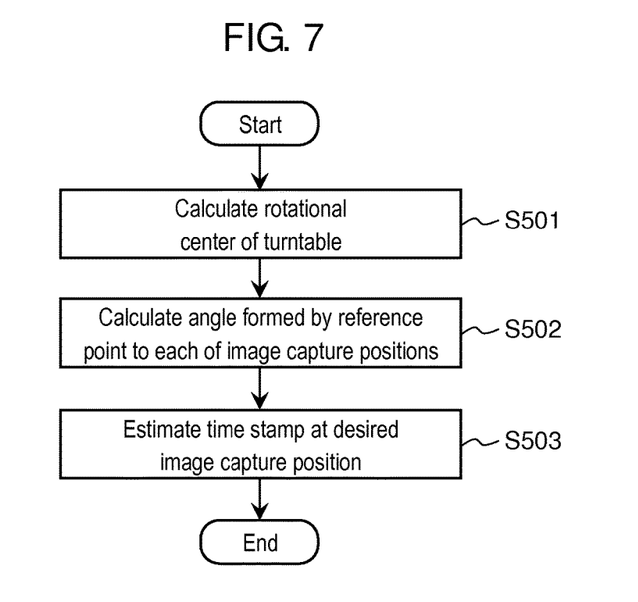
FIG. 7 is a flow chart illustrating an operation performed corresponding to an estimating method for time stamps of resampling points according to the exemplary embodiment.

FIG. 7 is a flow chart illustrating an operation performed corresponding to an estimating method for time stamps of resampling points according to the present exemplary embodiment. FIG. 7 illustrates a detail process of step S303 illustrated in FIG. 4.

First, image capture position calculation unit 12 calculates a rotational center position of turntable 23 on which object 24 is placed (in step S501). Specifically, the rotational center position of turntable 23 is calculated by the least squares method using the following Formulas 1 to 7.

Formula 1 represents a relationship between a center point and a radius of a sphere.

[Formula 1]

$$(X_i-X)^2+(Y_i-Y)^2+(Z_i-Z)^2=r^2 \quad \text{(Formula 1)}$$

In Formula 1, $X_i$, $Y_i$, $Z_i$ represent an x component, a y component, and a z component of coordinates of an initial sampling point, respectively, and X, Y, Z represent an x component, a y component, and a z component of coordinates of the rotational center position of turntable 23. In Formula 1, r represents a distance between the rotational center position of turntable 23 and an initial sampling point. In other words, r is a radius of a sphere whose center is the rotational center of turntable 23.

Formula 2 represents a cumulative square error of left side and right side of Formula 1.

[Formula 2]

$$\Sigma((X_i-X)^2+(Y_i-Y)^2+(Z_i-Z)^2-r^2)^2 \quad \text{(Formula 2)}$$

Assuming that $A=-2X$, $B=-2Y$, $C=-2Z$, $D=X^2+Y^2+Z^2-r^2$, Formula 2 can be rewritten as Formula 3.

[Formula 3]

$$\Sigma(X_i^2+Y_i^2+Z_i^2+AX_i+BY_i+CZ_i+D)^2 \quad \text{(Formula 3)}$$

Formulas 4 to 7 are equations when the value obtained by partially differentiating Formula 3 with variables A to D is 0. When Formula 3 that is partially differentiated with variable A to D becomes 0, a center point and a radius of a sphere where the cumulative square error represented by Formula 3 becomes minimum are calculated. Specifically, when coordinates $(X_0, Y_0, Z_0)$ to $(X_7, Y_7, Z_7)$ of initial sampling points are substituted into $(X_i, Y_i, Z_i)$ of Formulas 4 to 7 and the formulas are solved, the coordinates of the rotational center of turntable 23 can be calculated.

[Formula 4]

$$\frac{\partial}{\partial A} = \sum (AX_i^2 + BX_iY_i + CX_iZ_i + DX_i + X_i^3 + X_iY_i^2 + X_iZ_i^2) = 0 \quad \text{(Formula 4)}$$

[Formula 5]

$$\frac{\partial}{\partial B} = \sum (AX_iY_i + BY_i^2 + CY_iZ_i + DY_i + X_i^2Y_i + Y_i^3 + Y_iZ_i^2) = 0 \quad \text{(Formula 5)}$$

[Formula 6]

$$\frac{\partial}{\partial C} = \sum (AX_iZ_i + BY_iZ_i + CZ_i^2 + DZ_i + X_i^2Z_i + Y_i^2Z_i + Z_i^3) = 0 \quad \text{(Formula 6)}$$

[Formula 7]

$$\frac{\partial}{\partial D} = \sum (AX_i + BY_i + CZ_i + D + X_i^2 + Y_i^2 + Z_i^2) = 0 \quad \text{(Formula 7)}$$

In such a manner, the rotational center position of turntable 23 is calculated.

The coordinates of the center of turntable 23 is calculated by the least squares method as represented by Formulas 1 to 7. Alternatively, the coordinates of the rotational center of turntable 23 may be calculated by a robust estimation method using for example the random sample consensus (RANSAC) algorithm.

Thereafter, image capture position calculation unit 12 calculates an angle between a vector from the rotational center of turntable 23 to a reference point that is one of initial sampling points and a vector from the rotational center of turntable 23 to an initial sampling point other than the reference point (in step S502). For example, a point $S_0$ illustrated in FIG. 6 is designated as a reference point $S_b$. When the rotational center of turntable 23 is an origin O, coordinates of the point $S_b$ are represented by $(x_b, y_b, z_b)$ and coordinates of the other seven initial sampling points are represented by $(x_i, y_i, z_i)$ (where i=1 to 7). Formulas 8 and 9 calculate angles $\theta_i$ between the vector from the rotational center O of turntable 23 to the reference point $S_b$ and the vector from the rotational center O of turntable 23 to each of the other seven initial sampling points $S_i$.

[Formula 8]

$$\cos\theta_i = \frac{\overrightarrow{OS_b} \cdot \overrightarrow{OS_i}}{|\overrightarrow{OS_b}||\overrightarrow{OS_i}|} = \frac{x_b x_i + y_b y_i + z_b z_i}{\sqrt{x_b^2 + y_b^2 + z_b^2}\sqrt{x_i^2 + y_i^2 + z_i^2}} \quad \text{(Formula 8)}$$

[Formula 9]

$$\theta_i = \cos^{-1}\frac{x_b x_i + y_b y_i + z_b z_i}{\sqrt{x_b^2 + y_b^2 + z_b^2}\sqrt{x_i^2 + y_i^2 + z_i^2}} \quad \text{(Formula 9)}$$

In such a manner, the position of each of the initial sampling points is calculated as an angle to the reference point. In addition, image extracting unit 11 obtains the time stamps of eight initial sampling frames (in step S301). Thus, the angles of the eight initial sampling points to the resampling point correspond to the time stamps of the eight initial sampling frames.

Thereafter, image capture position calculation unit 12 estimates time samples of a plurality of frames captured and obtained by camera 21 at resampling points (in step S503).

Figure 8:
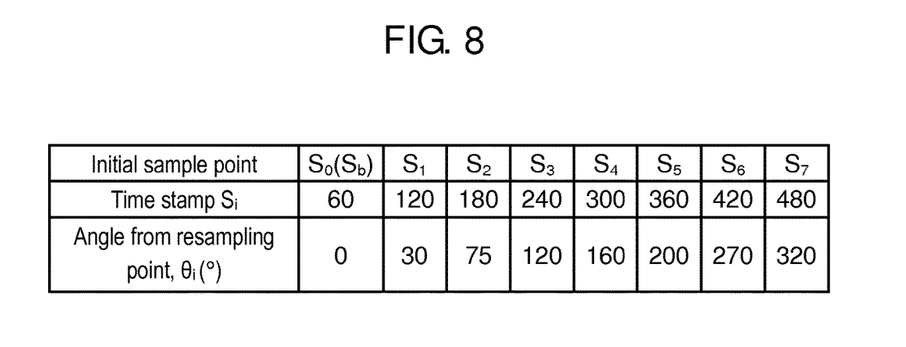
FIG. 8 is a table describing a relationship between time stamps of initial sampling points and angles to a reference point according to the exemplary embodiment.

FIG. 8 is a table describing a relationship between time stamps of initial sampling points and angles to the reference point in the present exemplary embodiment. The time stamps $s_i$ of individual initial sampling points correspond to the angles $\theta_i$ to the reference point.

In FIG. 8, the angles $\theta_i$ to the reference point are calculated for example by image capture position calculation unit 12 in step S502. According to the present exemplary embodiment, since image extracting unit 11 extracts initial sampling frames at time intervals of one second and a frame rate of a moving image stream is 60 fps, the time stamps $s_i$ are obtained at equal time intervals of 60 (one second). On the other hand, the angles $\theta_i$ to the reference point are not aligned at equal angular intervals. As described above, this is because turntable 23 does not rotate at a constant speed. Thus, even if image extracting unit 11 extracts a plurality of initial sampling frames so that the time stamps are aligned at equal time intervals, the initial sampling points are image capture positions that are not perfectly aligned.

The frame rate of a moving image stream is 60 fps. Alternatively, the frame rate of a moving image stream may be less than 60 fps, for example 30 fps, or greater than 60 pfs, for example 120 fps.

Figure 9:
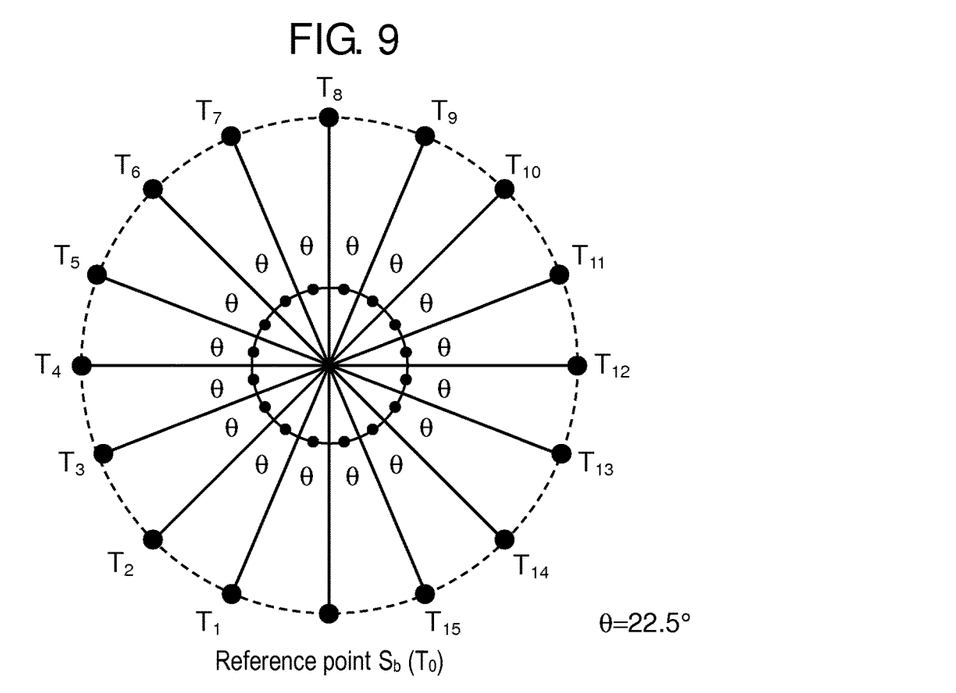
FIG. 9 is a schematic diagram describing resampling points according to the exemplary embodiment.

FIG. 9 is a schematic diagram describing resampling points according to the present exemplary embodiment. As illustrated in FIG. 9, image capture position calculation unit 12 estimates time stamps of 16 frames captured and obtained by camera 21 at resampling points aligned at equal intervals of for example 22.5 degrees. In FIG. 9, points $T_x$ (where x=0 to 15) are resampling points.

In the present exemplary embodiment, the number of resampling points is 16. Alternatively, the number of resampling points may be less than 16, for example, eight if resampling points are aligned at equal angular intervals of 45 degrees, or greater than 16, for example 36, if resampling points are aligned at equal angular intervals of 10 degrees.

Image capture position calculation unit 12 estimates time stamps $t_x$ of frames captured and obtained by camera 21 at the resampling points $T_x$. Specifically, the time stamps $t_x$ of the frames captured and obtained by camera 21 at the resampling points $T_x$ are estimated by angles $\theta_m$ and $\theta_{m-1}$ of initial sampling points $S_m$ and $S_{m-1}$ near the resampling points $T_x$ to the reference point and corresponding time stamps $s_m$ and $s_{m-1}$. In other words, the time stamps $t_x$ of the frames captured and obtained by camera 21 at the resampling points $T_x$ are estimated by linear interpolations of the angles $\theta_m$ and $\theta_{m-1}$ of the initial sampling points $S_m$ and $S_{m-1}$ to the reference point and the time stamps $s_m$ and $s_{m-1}$. According to the present exemplary embodiment, the number of resampling points is 16, namely x=0 to 15. In addition, the number of initial sampling points is 8, namely m=1 to 7. The time stamps $t_x$ of the frames captured and obtained by camera 21 at the resampling points $T_x$ are calculated by Formula 10.

[Formula 10]

$$t_x = \left\{ \left( \frac{x \times \theta - \theta_{m-1}}{\theta_m - \theta_{m-1}} \right)(s_m - s_{m-1}) \right\} + s_{m-1} \quad \text{(Formula 10)}$$

In Formula 10, $\theta$ represents an angle between adjacent resampling points aligned at equal angular intervals. In other words, as illustrated in FIG. 9, since time stamps of a plurality of frames captured and obtained by camera 21 at resampling points aligned at equal angular points of 22.5 degrees are estimated, the angle $\theta$ becomes 22.5.

Figure 10:
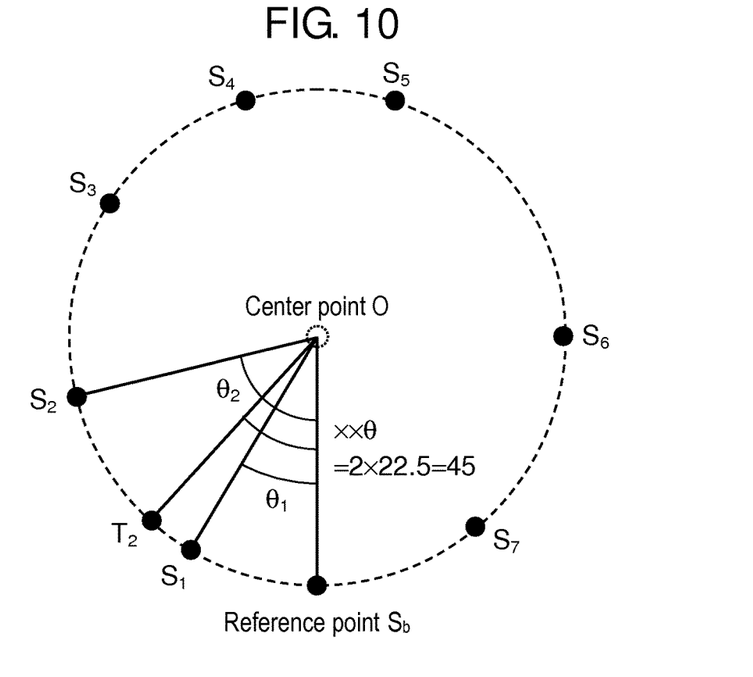
FIG. 10 is a schematic diagram describing an estimating method for time stamps of a plurality of frames captured and obtained at resampling points.

FIG. 10 is a schematic diagram describing an estimating method for time stamps of a plurality of frames captured and obtained at resampling points. As illustrated in FIG. 10, the time stamp $t_2$ of the frame captured and obtained by camera 21 at the resampling point $T_2$ is estimated by linear interpolations of the angles $\theta_2$ and $\theta_1$ of the initial sampling points $S_2$ and $S_1$ (m=2) near the resampling point $T_2$ (x=2) to the reference point and the time stamps $s_2$ and $s_1$. When the time stamps corresponding to the initial sampling points $S_2$ and $S_1$ and the angles to the reference point illustrated in FIG. 8 are substituted into Formula 10, the time stamp $t_2$ can be estimated. According to the present exemplary embodiment, the time stamp $t_2$ can be estimated as 140 based on $\theta_2=75$, $\theta_1=30$, $s_2=180$, and $s_1=120$.

As illustrated in FIG. 8, the eight initial sampling frames captured and obtained by camera 21 at eight initial sampling points are frames having time stamps aligned at equal time intervals of for example 60 (one second). Thus, as illustrated in FIG. 6, initial sampling points can be aligned on a circumference. As a result, the time stamps $t_x$ of the plurality of frames captured and obtained by camera 21 at the resampling points $T_x$ can be accurately estimated. On the other hand, if initial sampling points are unevenly aligned on the circumference, the lower the accuracy of a time stamp of a frame captured and obtained by camera 21 at a resampling point becomes, the more the resampling point is spaced apart from the initial sampling points that are unevenly aligned on the circumference.

According to the present exemplary embodiment, a plurality of initial sampling frames are frames having time stamps aligned at equally time intervals. Alternatively, a plurality of initial sampling frames may not be frames having time stamps aligned at equally time intervals.

Similarly to the time stamp $t_2$ estimated as 140, time stamps of frames captured and obtained by camera 21 at other sampling points can be estimated. Thus, time stamps of a plurality of frames captured and obtained by camera 21 at a plurality of resampling points can be estimated.

Last, in the resampling, image extracting unit 11 extracts resampling frames having time stamps estimated by image capture position calculation unit 12 as a plurality of frames captured and obtained by camera 21 at resampling points from a moving image stream stored in captured image storage unit 40. Image extracting unit 11 stores the extracted resampling frames as still images to multi-viewpoint image DB 50.

[1-3. Effects]

As described above, the present technique is a still-image extracting method for extracting a plurality of frames of an object as still images from a moving image stream chronologically continuously captured by a camera, the camera moving relative to the object, the method including extracting a plurality of first frames from the moving image stream and obtaining image capture times of the extracted plurality of first frames, identifying image capture positions of the camera at the image capture times of the plurality of first frames from the plurality of first frames, estimating image capture times of the plurality of frames captured and obtained at a plurality of image capture positions spaced at equal intervals based on the image capture positions of the camera identified by the plurality of first frames and the obtained image capture times, and extracting second frames at the estimated image capture times as a plurality of frames captured and obtained at a plurality of image capture positions spaced apart at equal intervals from the moving image stream.

Thus, still images at image capture positions spaced apart at equal intervals can be captured and extracted in a short period of time.

In other words, according to the present exemplary embodiment, in the initial sampling operation, a plurality of initial sampling frames are extracted from a moving image stream. Then, time stamps of the plurality of initial sampling frames are obtained. Thereafter, initial sampling points of the extracted initial sampling frames are identified. Thereafter, time stamps of a plurality of frames captured and obtained by the camera at resampling points are estimated based on the identified initial sampling points and the time stamps of the initial sampling frames. Last, resampling frames having the estimated time stamps are extracted as the plurality of frames captured and obtained by camera 21 at the resampling points from the moving image stream.

Thus, when a camera captures still images of an object while moving relative to the object, the still images captured at a plurality of image capture positions spaced at equal intervals can be extracted from a group of still images captured at image capture positions spaced apart at not equal intervals. Consequently, still images at image capture positions spaced apart at equal intervals can be captured and extracted in a short period of time.

The still-image extracting method also includes identifying the image capture positions of the second frames extracted from the moving image stream based on the second frames, determining whether or not a positional deviation between each of the image capture positions of the second frames and each of a plurality of image capture positions spaced apart at equal intervals falls within a predetermined range, and when the positional deviation falls out of the predetermined range, re-estimating the image capture times of the frames captured and obtained by the camera at the positions spaced at equal intervals based on the image capture positions and image capture times of the extracted second frames, and extracting the second frames at the re-estimated image capture times as the frames captured and obtained at the plurality of image capture positions spaced apart at equal intervals from the moving image stream.

Thus, still images at image capture positions spaced apart at equal intervals can be accurately extracted.

When the image capture times is estimated, the image capture times of the plurality of frames captured and obtained at a plurality of image capture positions spaced apart at equal intervals are estimated by linear interpolations of the identified image capture positions of the plurality of first frames and the obtained image capture times.

Thus, image capture times of a plurality of frames captured and obtained by the camera at a plurality of image capture positions spaced apart at equal intervals can be estimated.

When the image capture positions of the plurality of first frame are identified, a plurality of feature points extracted from the plurality of first frames are matched. Corresponding points of the frames are calculated. An SFM algorithm is applied for the corresponding points of the frames. The image capture positions are identified.

Thus, image capture positions of a plurality of frames contained in a moving image stream captured by a camera can be identified.

When the second frames are extracted at the estimated image capture times, the second frames are extracted as a plurality of frames captured and obtained by the camera at a plurality of image capture positions aligned at equal angular intervals from a moving image stream captured and obtained by the camera which moves on the circumference centering the object.

Thus, peripheral images at image capture positions spaced apart at equal intervals can be extracted from a moving image stream captured and obtained at positions on a circumference centering an object.

When the second frames are extracted at the estimated image capture times, the plurality of second frames are extracted from a moving image stream captured and obtained by the camera that moves in a tangent direction of a circumference centering the object so as to generate a three-dimensional image with parallax.

Thus, a three-dimensional image having parallax can be generated from a moving image stream captured and obtained in a depth direction.

When the second frames are extracted at the estimated image capture times, the second frames are extracted as a plurality of frames captured and obtained by the camera at a plurality of image capture positions spaced apart at equal intervals from a moving image stream captured and obtained while the camera moves along a straight line.

An image processing device according to the present technique extracts a plurality of frames of an object as still images from a moving image stream chronologically continuously captured by a camera, the camera moving relative to the object. The image processing device includes an image extracting unit and an image capture position calculation unit. The image extracting unit extracts a plurality of first frames from the moving image stream and obtains image capture times of the extracted first frames. The image capture position calculation unit identifies image capture positions of the camera at the image capture times of the plurality of first frames based on the plurality of first frames and estimates image capture times of the plurality of frames captured and obtained at a plurality of image capture positions spaced at equal intervals based on the image capture positions of the camera identified by the plurality of first frames and the obtained image capture times. The image extracting unit also extracts second frames at the image capture times estimated by the image capture position calculation unit as a plurality of frames captured and obtained at a plurality of image capture positions spaced apart at equal intervals from the moving image stream.

Thus, still images at effective image capture positions spaced apart at equal intervals can be captured and extracted at a short period of time.

Figure 11:
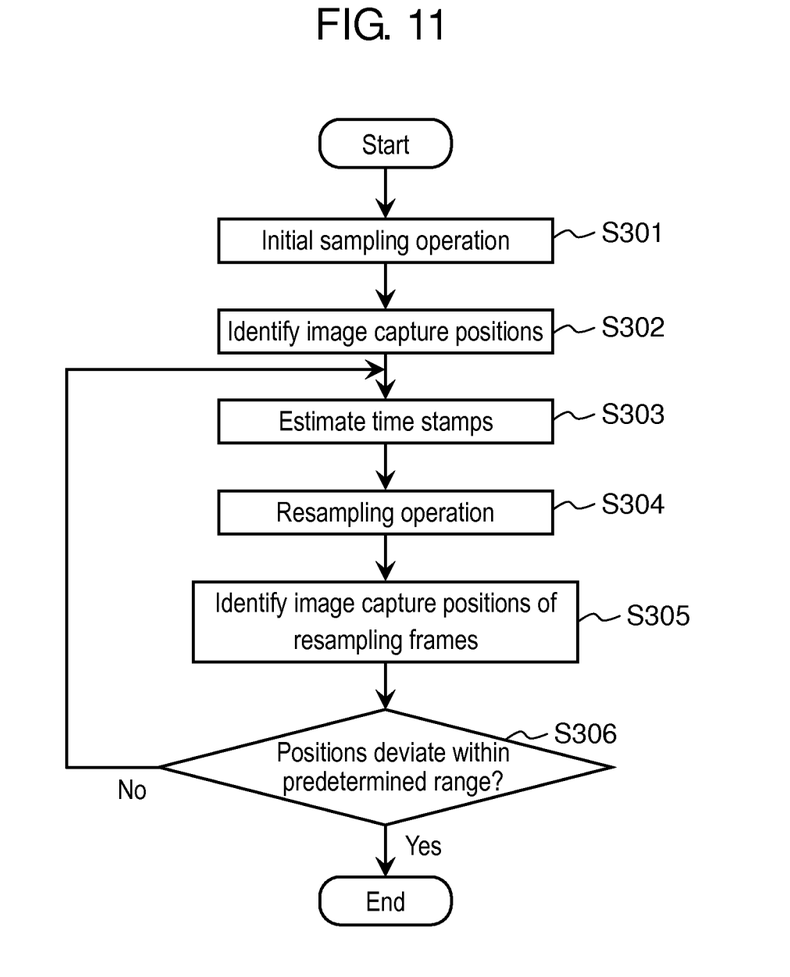
FIG. 11 is a flow chart illustrating an operation performed corresponding to a still-image extracting method according to another exemplary embodiment of the present technique.

FIG. 11 is a flow chart showing an operation performed corresponding to a still-image extracting method according to another exemplary embodiment of the present technique.

Image processing unit 10 of an image processing system according to the present exemplary embodiment verifies image capture positions of resampling frames extracted in a resampling operation. If the image capture positions deviate from resampling points, image processing unit 10 performs the resampling operation again.

The process of steps S301 to S304 illustrated in FIG. 11 is the same as the process of steps S301 to S304 illustrated in FIG. 4. In step S304, image extracting unit 11 extracts resampling frames as a plurality of frames captured and obtained by camera 21 at resampling points from a moving image stream. Resampling frames corresponding to time stamps estimated in step S303 are not always a plurality of frames captured and obtained by camera 21 at resampling points. Specifically, unless time stamps and angles to a reference point between two initial sampling points near a resampling point have a proportional relationship, an estimation result in step S303 becomes incorrect.

If a rotation speed of turntable 23 is not constant, time stamps and angles to the reference point between the initial sampling points do not have a proportional relationship.

Thus, time stamps estimated by interpolations of time stamps and angles to the reference point that do not have a proportional relationship are not time stamps of resampling points.

According to the present exemplary embodiment, a plurality of resampling frames extracted in the resampling in step S304 are not directly stored as still images to multi-viewpoint image DB 50. Instead, image extracting unit 11 identifies image capture positions of the resampling frames extracted in the resampling from a moving image stream in step S304 based on the frames and the initial sampling frames (in step S305). In other words, the process in step S302 is performed for the resampling frames extracted in the resampling. As a result, it is determined whether or not the estimation result in step S303 is correct.

Thereafter, image extracting unit 11 determines whether or not a positional deviation between each of the image capture positions identified in step S305 for the resampling frames extracted in the resampling, namely a resampling point, and each of image capture positions spaced apart at equal intervals falls within a predetermined range (in step S306). For example, image extracting unit 11 determines whether or not a positional deviation between each of image capture positions identified in step S305 for resampling frames extracted in the resampling and each of image capture positions spaced apart at equal angular intervals of 22.5 degrees, for example, a resampling point at an angle of 45 degrees, falls within a predetermined range.

When all the positional deviations of the plurality of resampling frames extracted in the resampling fall within the predetermined range (YES in step S306), image extracting unit 11 stores the plurality of resampling frames extracted in the resampling as still images to multi-viewpoint image DB 50.

When the positional deviations of the plurality of resampling frames extracted in the resampling fall out of the predetermined range (NO in step S306), image extracting unit 11 estimates time stamps of frames captured and obtained by camera 21 at resampling points based on the image capture positions and the time stamps of the resampling frames extracted in the resampling. In other words, since the image capture positions of the plurality of resampling frames extracted in the resampling, and the time stamps are added to the image capture positions of the plurality of initial sampling frames, estimation accuracy in step S303 improves. Thereafter, image extracting unit 11 extracts frames having the estimated time stamps as frames captured and obtained by camera 21 at the resampling points from the moving image stream. In other words, image extracting unit 11 repeats the resampling operation for the resampling frames that have been extracted most recently until the positional deviations of the extracted resampling frames fall within the predetermined range. As a result, frames can be securely extracted so that the positional deviation falls within the predetermined range. In other words, frames at resampling points can be accurately extracted.

As described above, image capture positions of a plurality of resampling frames extracted from a moving image stream in the resampling are identified based on the resampling frames. It is determined whether or not the positional deviation of the image capture position of the resampling frame extracted in the resampling with respect to the resampling point falls within the predetermined range. When the positional deviations of the plurality of resampling frames extracted in the resampling fall out of the predetermined range, the time stamps of the frames captured and obtained by camera 21 at the resampling points are estimated based on the image capture positions and the time stamps of the resampling frames extracted in the resampling. The resampling operation is repeated by using the resampling frames extracted in the most recent sampling until the positional deviations of the resampling frames extracted with the estimated time stamps fall within predetermined range.

Thus, since the resampling operation is repeated until the positional deviations of the plurality of resampling frames extracted in the resampling fall within the predetermined range, still images at effective image capture positions spaced apart at equal intervals can be extracted.

Figure 12:
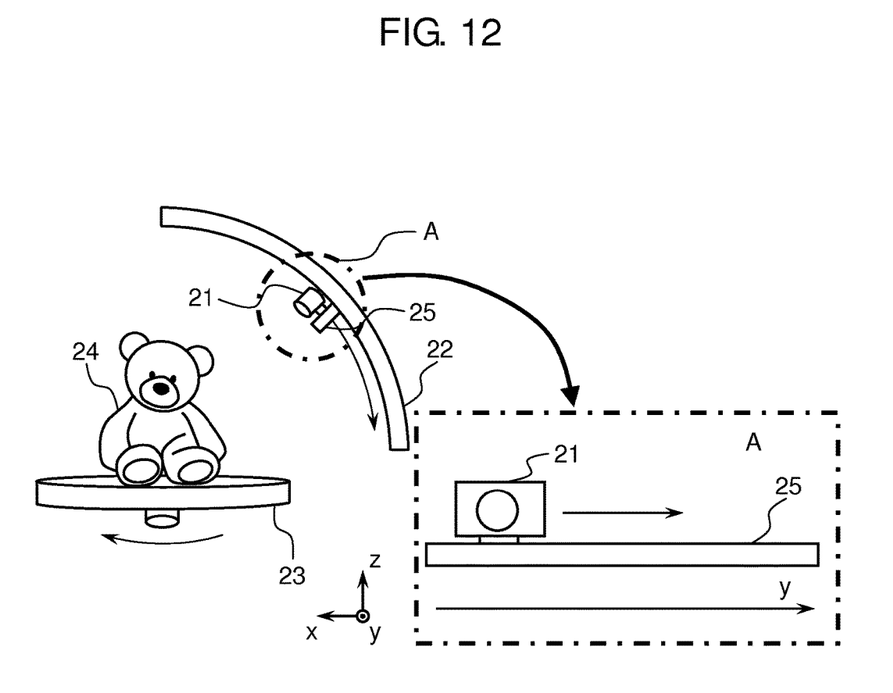
FIG. 12 is a schematic diagram illustrating an object image capture method according to the other exemplary embodiment of the present technique.

FIG. 12 is a schematic diagram describing an image capturing method for an object according to another exemplary embodiment of the present technique. As illustrated in FIG. 12, beside robot arm 22, image capture unit 20 has slider 25 to which camera 21 is mounted.

In a box surrounded by dashed lines illustrated in FIG. 12 (a portion represented by an arrow A), robot arm 22 have slider 25 and camera 22 mounted on slider 25. Robot arm 22 holds slider 25 so that slider 25 moves on a circumferential direction on an XZ plane illustrated in FIG. 12 in which object 24 is centered. Slider 25 holds camera 21 so that camera 21 moves in a y axis direction in the figure as represented by the arrow A illustrated in FIG. 12. The portion surrounded by the dashed lines illustrated in FIG. 12 represents camera 21 that moves on slider 25 in the y axis direction viewed from a front of camera 21.

According to the exemplary embodiment illustrated in FIG. 1, camera 21 captures images of object 24 while moving relative to object 24 on the circumference centering object 24 so as to generate a moving image stream. In contrast, according to the exemplary embodiment illustrated in FIG. 12, camera 21 also moves in a tangent direction of the circumference centering object 24 (in the y axis direction). After camera 21 moves in the y direction, camera 21 captures images of object 24 while moving relative to object 24 and on the circumference centering object 24. Specifically, controller 30 performs the following control.

Similarly to the exemplary embodiment illustrated in FIG. 1, according to the exemplary embodiment illustrated in FIG. 12, controller 30 repeatedly controls the rotation of turntable 23 and the movement of camera 21 by robot arm 22. Thus, camera 21 captures images of object 24 at spherical positions centering object 24. Controller 30 controls camera 21 to move on slider 25 so that camera 21 moves in the y axis direction illustrated in FIG. 12 and captures images of object 24. After moving camera 21 in the y axis direction, controller 30 causes camera 21 to capture images of object 24 at spherical positions of object 24. As a result, since camera 21 captures images of object 24 in the depth direction, a moving image stream is captured and obtained at spherical positions of object 24 so as to generate a three-dimensional image having parallax.

As described above, according to the present exemplary embodiment, while camera 21 moves in the tangent direction of the circumference centering object 24, camera 21 captures images of object 24.

Thus, a moving image stream of frames is obtained so as to generate a three-dimensional image having parallax. As a result, a plurality of frames is extracted so as to generate a three-dimensional image having parallax.

The present technique can be applied to for example an image processing device that extracts still images so as to interactively display a three-dimensional image of an object.

As described above, as examples of the present technique, exemplary embodiments are described. To describe the examples, the accompanying drawings and detailed description are provided.

Thus, structural elements described in the accompanying drawings and detailed description contain not only structural elements necessary to solve the problem, but also those not necessary to do so. Although the structural elements that are not necessary to solve the problem are described in the accompanying drawings and the detailed description, they should not be recognized as those not necessary to solve the problem.

The foregoing exemplary embodiments just exemplify the present technique. Thus, it should be understood by a person skilled in the art that the foregoing and various other changes, substitutions, additions, and omissions in the form and detail thereof may be made therein without departing from the scope of the present technique.

What is claimed is:

1. A still-image extracting method for extracting a plurality of frames of an object as still images from a moving image stream chronologically continuously captured by a camera, the camera moving relative to the object, the method comprising:
   extracting a plurality of first frames from the moving image stream and obtaining image capture times of each of the first frames extracted;
   identifying image capture positions of the camera at the image capture times of each of the first frames based on the plurality of first frames;
   estimating image capture times of the plurality of frames captured at a plurality of image capture positions spaced at equal intervals based on both the image capture positions, identified by each of the first frames, of the camera and the obtained image capture times;
   extracting, from the moving image stream, second frames at the estimated image capture times as a plurality of frames captured at a plurality of image capture positions spaced apart at equal intervals,
   identifying the image capture positions of the second frames extracted from the moving image stream based on the second frames;
   determining whether or not a positional deviation between each of the image capture positions of the second frames and a corresponding one of the plurality of image capture positions spaced apart at equal intervals falls within a predetermined range, and when the positional deviation falls out of the predetermined range, re-estimating the image capture times of the frames captured by the camera at the positions spaced at equal intervals based on both the image capture positions and image capture times of the extracted second frames; and
   extracting the second frames at the re-estimated image capture times as the frames captured at the plurality of image capture positions spaced apart at equal intervals from the moving image stream.

2. The still-image extracting method according to claim 1, wherein estimating the image capture times includes estimating the image capture times of the plurality of frames captured at a plurality of image capture positions spaced apart at equal intervals by using linear interpolations based on the identified image capture positions of the plurality of first frames and the obtained image capture times.

3. The still-image extracting method according to claim 1, wherein identifying the image capture positions of the plurality of first frame includes matching a plurality of feature points extracted from the plurality of first frames, calculating corresponding points of the frames, applying an Structure From Motion algorithm to the calculated corresponding points of the frames, and identifying the image capture positions.

4. The still-image extracting method according to claim 1, wherein extracting the second frames at the estimated image capture times includes extracting the second frames as a plurality of frames captured by the camera at a plurality of image capture positions aligned at equal angular intervals from a moving image stream captured by the camera that moves on a circumference centering the object.

5. The still-image extracting method according to claim 1, wherein extracting the second frames at the estimated image capture times includes extracting the plurality of second frames from a moving image stream captured by the camera that moves in a tangent direction of a circumference centering the object so as to generate a three-dimensional image with parallax.

6. The still-image extracting method according to claim 1, wherein extracting the second frames at the estimated image capture times includes extracting the second frames as a plurality of frames captured by the camera at a plurality of image capture positions spaced apart at equal intervals from a moving image stream captured by the camera being moved along a straight line.

7. An image processing device for implementing a still-image extracting method for extracting a plurality of frames of an object as still images from a moving image stream chronologically continuously captured by a camera, the camera moving relative to the object, the device including:
   an image extracting device; and
   an image capture position calculation device,
   wherein the image extracting device extracts a plurality of first frames from the moving image stream and obtains image capture times of the extracted plurality of first frames,
   wherein the image capture position calculation device identifies information on image capture positions of the camera at the image capture times obtained by the plurality of first frames, and estimates image capture times of the plurality of frames captured at a plurality of image capture positions spaced at equal intervals based on both the information on the image capture positions, identified by the plurality of first frames, of the camera and the obtained image capture times,
   wherein the image extracting device extracts, from the moving image stream, second frames corresponding to the image capture times estimated by the image capture position calculation device as a plurality of frames captured at a plurality of image capture positions spaced apart at equal intervals,
   wherein the image capture position calculation device further identifies the image capture positions of the second frames extracted from the moving image stream based on the second frames, and determines whether or not a positional deviation between each of the image capture positions of the second frames and a corresponding one of the plurality of image capture positions spaced apart at equal intervals falls within a predetermined range, and when the positional deviation falls out of the predetermined range, re-estimates the image capture times of the frames captured by the camera at the positions spaced at equal intervals based on both the image capture positions and image capture times of the extracted second frames; and wherein the image extracting device further extracts the second frames at the re-estimated image capture times as the frames captured at the plurality of image capture positions spaced apart at equal intervals from the moving image stream.

8. The image processing device of claim 7, wherein estimating the image capture times includes estimating the image capture times of the plurality of frames captured at a plurality of image capture positions spaced apart at equal intervals by using linear interpolations based on the identified image capture positions of the plurality of first frames and the obtained image capture times.

9. The image processing device of claim 7, wherein identifying the image capture positions of the plurality of first frame includes matching a plurality of feature points extracted from the plurality of first frames, calculating corresponding points of the frames, applying an Structure From Motion algorithm to the calculated corresponding points of the frames, and identifying the image capture positions.

10. The image processing device of claim 7, wherein extracting the second frames at the estimated image capture times includes extracting the second frames as a plurality of frames captured by the camera at a plurality of image capture positions aligned at equal angular intervals from a moving image stream captured by the camera that moves on a circumference centering the object.

11. The image processing device of claim 7, wherein extracting the second frames at the estimated image capture times includes extracting the plurality of second frames from a moving image stream captured by the camera that moves in a tangent direction of a circumference centering the object so as to generate a three-dimensional image with parallax.

12. The image processing device of claim 7, wherein extracting the second frames at the estimated image capture times includes extracting the second frames as a plurality of frames captured by the camera at a plurality of image capture positions spaced apart at equal intervals from a moving image stream captured by the camera being moved along a straight line.

* * * * *